H. DECHAMPS.
RELEASABLE COUPLING WITH AUTOMATIC RETURN.
APPLICATION FILED JAN. 30, 1913.

1,105,408. Patented July 28, 1914.

Witnesses:
Earl G. Klock.
J. Ellis Glen

Inventor:
Heinrich Dechamps,
by: 
His Attorney.

UNITED STATES PATENT OFFICE.

HEINRICH DECHAMPS, OF CHARLOTTENBURG, GERMANY, ASSIGNOR TO GENERAL ELECTRIC COMPANY, A CORPORATION OF NEW YORK.

RELEASABLE COUPLING WITH AUTOMATIC RETURN.

1,105,408.      Specification of Letters Patent.      Patented July 28, 1914.

Application filed January 30, 1913. Serial No. 745,155.

*To all whom it may concern:*

Be it known that I, HEINRICH DECHAMPS, a subject of the King of Prussia, residing at Charlottenburg, Germany, have invented certain new and useful Improvements in Releasable Couplings with Automatic Return, of which the following is a specification.

For some classes of work, notably for internal combustion engines, it is desirable to have a means for disconnecting one shaft from another when the speed becomes too high and for automatically re-connecting said shafts when the speed is reduced again to the proper value. Such an arrangement is useful between the driving shaft and the shaft of a pump supplying fuel to the engine cylinders. The pump strokes usually have some definite relation to the engine strokes and by providing the coupling parts with one or two jaws the parts will reunite in a manner to establish the proper relation of the pump strokes to the engine strokes.

Figure 1:
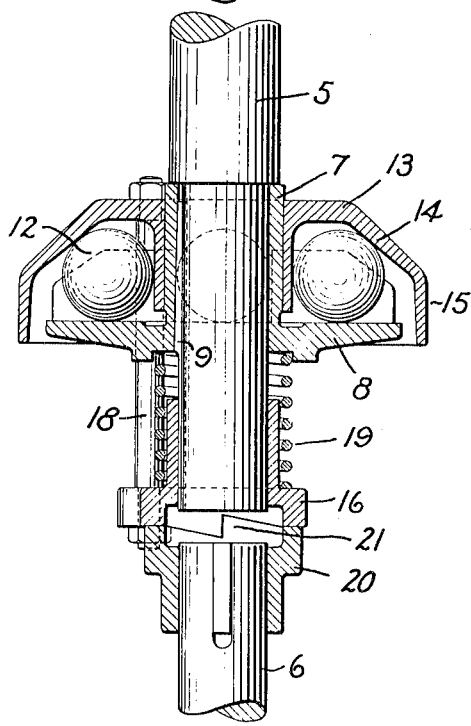
Figure 2:
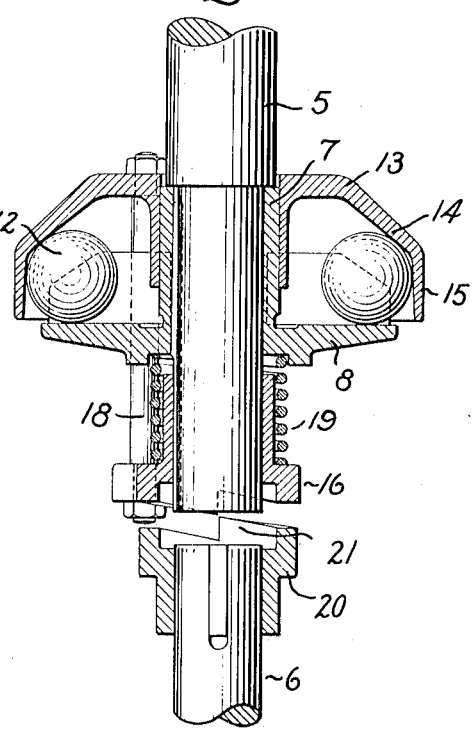
Figure 3:
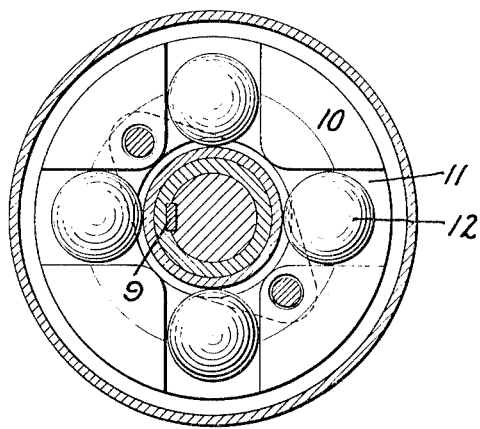
Figure 4:
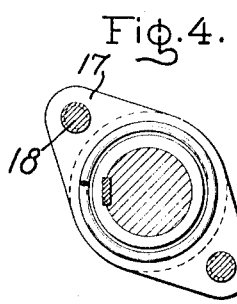

In the accompanying drawing which is illustrative of my invention, Figure 1 is a view in longitudinal section of my improved releasable coupling showing the parts in engagement; Fig. 2 is a similar view showing the parts disengaged; Fig. 3 is a transverse section showing the arrangement of the weights; and Fig. 4 is a detailed view in plan of the upper coupling member.

5 indicates the driving shaft and 6 the driven shaft. Keyed or otherwise secured to the driving shaft is a member having a hub-like portion 7 and a flange 8 formed integral therewith. This member is caused to rotate with the shaft by the key 9. On the upper face of the flange are segmental projections 10, between which are formed slots 11 to receive and guide the movement of the balls 12. These balls move outwardly in response to an increase in speed and inwardly in response to a decrease in speed. The hub 7 has a finished peripheral surface and mounted thereon in a manner to slide axially is a hood 13 having a beveled or conical face 14 with which the balls engage. The hood completely incloses the balls and is provided with an angular portion 15 which acts as a stop for the outward movements of the balls as indicated in Fig. 2.

16 indicates a movable coupling member which is splined to the shaft 5, the key 9 being extended to the end of the shaft for this purpose. The member 16 is provided with two ears or lugs 17, Fig. 4, to receive the shouldered bolts or rods 18. These bolts are attached at their upper ends to the hood 13, so that any movement of the hood is transmitted to the upper coupling member. Surrounding the hub of said member and resting on an enlarged part thereof and engaging the flanged member 8 is a coiled compression spring 19, which opposes the outward movements of the balls and tends to restore them to the position shown in Fig. 1 and also to move the upper coupling member into engagement with the lower coupling member. Keyed on the driven shaft 6 is a coupling member 20. The members 16 and 20 are provided with locking jaws 21; as shown each member is provided with two jaws. The number of jaws may be varied to suit different conditions of service.

When the speed of the driving shaft is normal the parts will be in the position shown in Fig. 1, but when for any reason the speed is increased above a certain predetermined value the balls roll outward in a radial direction, toward the flange 8 and lift the hood, together with the coupling member 16, thereby releasing the two shafts. When the speed decreases the spring 19 forces the bolts downward and at the same time moves the upper jaw of the clutch or coupling into engagement with the lower jaw.

Under some conditions shaft 5 may be the driven shaft and 6 the driving shaft. I find it desirable to make the weights spherical but they may be given other forms if desired. Instead of providing only one of the coupling are separated when the speed in it, both members may be similarly provided, as will readily be understood. I have shown the parts so arranged that the parts of the coupling are separated when the speed increases above certain predetermined values. I may, however, so arrange them that the parts of the coupling are separated when the driving shaft is at rest or moving slowly, and are connected when the driving shaft is moved at a greater speed. I have shown the hood and the coupling member 16 as being made of separate parts and united by the rods 18. As regards the essence of the invention it is immaterial whether these parts are separated or formed in one integral structure.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a device of the character described, the combination of driving and driven shafts, a member fixed upon one of the shafts, weights carried by the member and moving in response to centrifugal force, an element having a beveled face with which the weights engage to move it axially, a spring opposing the action of the weights, a coupling member splined on one of the shafts, means extending parallel with the shaft to connect said element and member, and a second coupling member mounted on the other shaft and coöperating with the first.

2. In a device of the character described, the combination of driving and driven shafts, a flanged member fixed to rotate with one of the shafts, weights that roll on said flange in response to speed changes, a hood having a beveled surface that engages the weights and is moved thereby, a coupling member splined on the same shaft that carries the flanged member, means connecting the hood and coupling member, a coiled spring interposed between the flanged and coupling members, and a second coupling member mounted on the other shaft and coöperating with the first.

3. In a device of the character described, the combination of driving and driven shafts, a flanged member fixed to rotate with one of the shafts, weights that roll on said flange in response to speed changes, guides for the weights, a hood that completely incloses the weights and has a beveled surface with which the weights engage to move it, a jaw coupling splined on a shaft, rods connecting it with the hood, a coiled compression spring between the coupling and the flange member which opposes the outward movement of the weights, and a second jaw coupling that is carried by the other shaft and engages the first.

4. In a device of the character described, the combination of a driving and a driven shaft, a flanged member fastened to the shaft, guides on one face of the flange arranged to form slots, balls which roll in the slots in response to speed changes, a member that coöperates with and is moved axially by the balls, means opposing the movements of the balls, and a coupling comprising a pair of coöperating elements one of which rotates with one shaft while the other element rotates with the other shaft and means connecting one of said elements to said axially movable member for movement therewith.

5. In a device of the character described, the combination of axially alined driving and driven shafts, a flange fixed to one of said shafts, weights that move on said flange in response to speed changes, a hood slidably mounted on the one shaft adjacent to said flange having a conical surface for engagement with the weights and adapted to be moved axially on the shaft thereby, means opposing the outward movement of the weights, a jaw coupling member slidably mounted on the same shaft as the flange and hood, means connecting the coupling with the hood, and a coöperating coupling fixed to the other shaft.

6. In a device of the character described, the combination of driving and driven shafts, a flanged member fixed to rotate with one of the shafts, weights that roll on said flange in response to speed changes, an element having a beveled face with which weights engage to move it axially, a spring opposing the action of the weights, a coupling member splined on one of the shafts, means connecting said element and member, and a second coupling member mounted on the other shaft and coöperating with the first.

7. In a device of the character described, the combination of driving and driven shafts, a member fixed upon one of the shafts, weights carried by the member and moving in response to centrifugal force, an element having a beveled face with which the weights engage to move it axially, a spring opposing the action of the weights, a coupling member splined on the same shaft that carries the fixed member, means extending parallel with the shaft to connect said coupling and member, and a second coupling member mounted on the other shaft and coöperating with the first.

In witness whereof, I have hereunto set my hand this 17 day of January, 1913.

HEINRICH DECHAMPS.

Witnesses:
BERNHARD KRÄMER,
ALFRED KÜPPER.

It is hereby certified that in Letters Patent No. 1,105,408, granted July 28, 1914, upon the application of Heinrich Dechamps, of Charlottenberg, Germany, for an improvement in "Releasable Couplings with Automatic Return," an error appears in the printed specification requiring correction as follows: Page 1, line 95, strike out the words "are separated when the speed in" and insert the words *members with a means for moving;* and that the said Letters Patent should be read with this correction therein that the same may conform to the record of the case in the Patent Office.

Signed and sealed this 1st day of September, A. D., 1914.

[SEAL.]

R. F. WHITEHEAD,
*Acting Commissioner of Patents.*